Feb. 27, 1951 W. G. MEREDITH 2,543,296
TIRE AND WHEEL DOLLY AND LIFT
Filed June 24, 1947 2 Sheets-Sheet 1
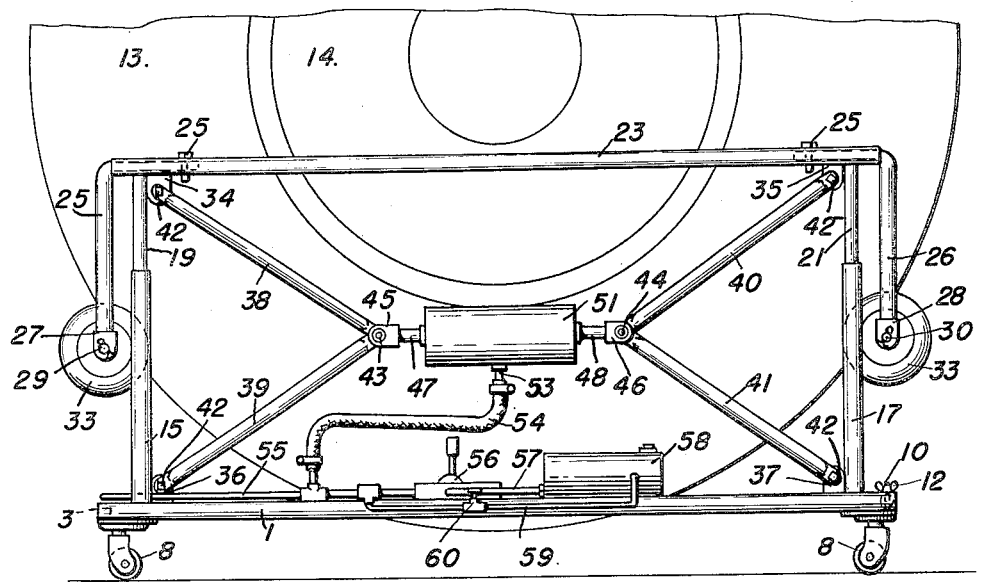
Fig. 1.
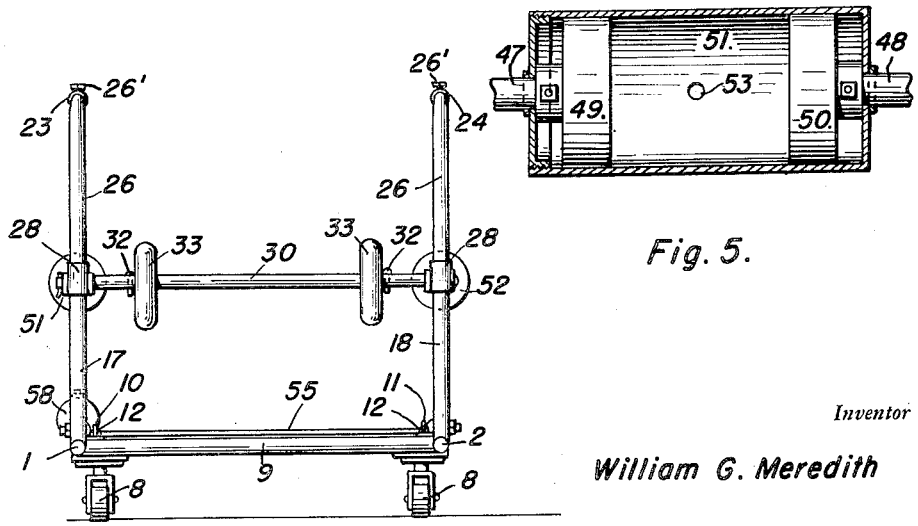
Fig. 2.
Fig. 5.
Inventor
William G. Meredith Feb. 27, 1951 — W. G. MEREDITH — 2,543,296
TIRE AND WHEEL DOLLY AND LIFT
Filed June 24, 1947 — 2 Sheets-Sheet 2

Inventor
William G. Meredith

By Clarence A. O'Brien
and Harvey B. Jacobson
Attorneys

Patented Feb. 27, 1951

2,543,296

UNITED STATES PATENT OFFICE 2,543,296

TIRE AND WHEEL DOLLY AND LIFT

William G. Meredith, Crestview, Fla., assignor of fifty per cent to Percy W. Dunn, Crestview, Fla.

Application June 24, 1947, Serial No. 756,731

6 Claims. (Cl. 254—9)

This invention relates to an improved tire and wheel dolly and lift construction.

An object of the invention is to provide an improved tire and wheel dolly and lift which will be hydraulically operated for raising and lowering large tire casings and wheels when mounting and dismounting the same.

Another object of the invention is to provide an improved wheeled dolly and lift which will be adjustable for use in connection with various sizes of tire casings and wheels, and self-contained hydraulic manually operated means for raising and lowering the lift.

A further object of the invention is to provide an improved extensible and adjustable wheeled dolly and lift for use in mounting and demounting large tire casings for heavy bomber and transport airplanes, tractors and trucks, and for road building and earth moving equipment.

Another object of the invention is to provide an improved tire and wheel dolly and lift which will be highly efficient in operation and relatively inexpensive to manufacture and produce.

Other objects will appear as the description proceeds.

In the accompanying drawings which form a part of this application,

Figure 1 is a side elevation of the improved tire and wheel dolly and lift with a tire casing and wheel supported thereon in raised or elevated position;

Figure 2 is an end elevation of the improved tire and wheel dolly and lift;

Figure 5 is a longitudinal sectional view through the hydraulic operating cylinder for the lift.

Like characters of reference are used throughout the following specification and the accompanying drawings to designate corresponding parts.

In carrying out the invention, there is provided an improved tire and wheel dolly and lift including a substantially U-shape frame having oppositely extending parallel arms 1 and 2, and an end connecting arm 3 preferably formed of a piece of tubing or pipe.

Four bracket members 4, 5, 6 and 7 are suitably secured to the corners and outer ends of the U-shape frame, and support four casters 8 upon which the U-shape dolly frame including the arms 1, 2 and 3 may be readily rolled from place to place and into and out of position and engagement with a tire casing and wheel for mounting or demounting the same.

Figure 3:
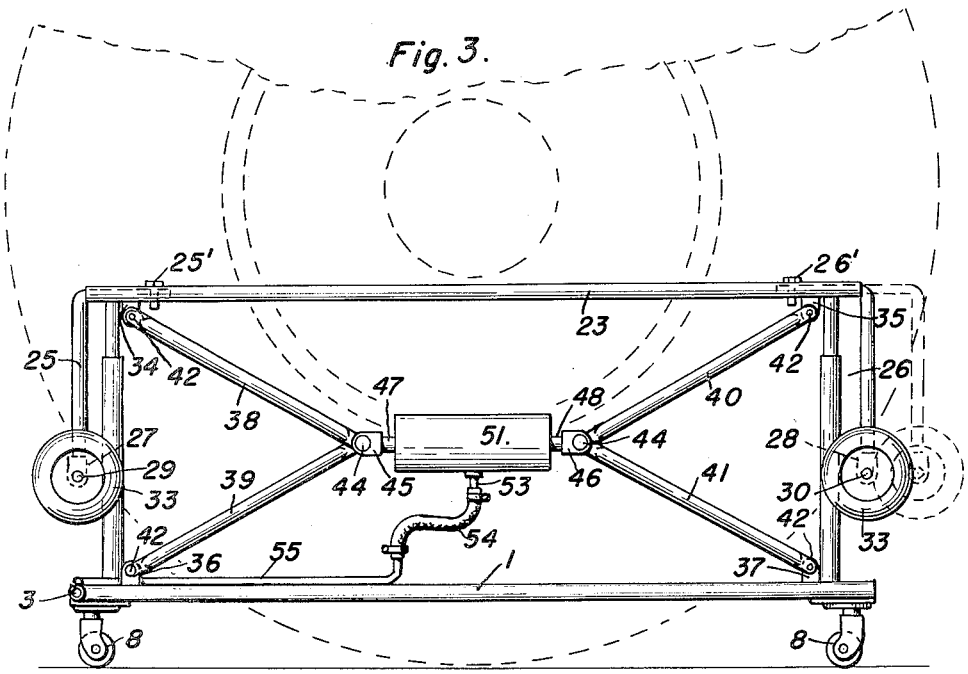
Figure 3 is a side elevation of the improved tire and wheel dolly and lift in its lowermost position with a tire casing and wheel disposed therein in contact with the ground.
Figure 4:
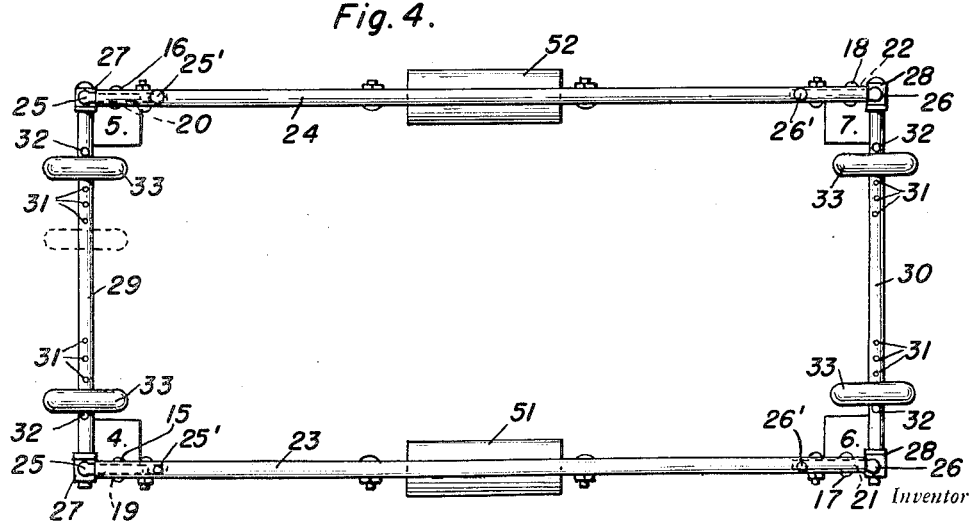
Figure 4 is a plan view of the improved tire and wheel dolly and lift.

The end closure tube or pipe 9 is vertically supported at its opposite ends to receive the upwardly extending threaded bolts 10 and 11 secured to the brackets 6 and 7, and wing nuts 12 will be disposed over the bolts 10 and 11 to firmly secure the end closure tube or pipe 9 in fixed position. When a tire casing and wheel are to be engaged by the dolly and lift, the wing nuts 12 will be removed and the end closure tube or pipe 9 may be quickly removed in order that the dolly frame may be rolled into place as shown in Figure 3 of the drawings in position to lift the tire 13 and wheel 14 for mounting or dismounting purposes.

Four upwardly extending guide tubes 15, 16, 17 and 18 are welded or otherwise secured to the ends of the side frame arms 1 and 2, and telescopically receive the four depending smaller guide tubes 19, 20, 21 and 22 which are welded or otherwise suitably fixed to the longitudinally extending parallel upper tubular frame side arms 23 and 24.

A pair of inverted L-shaped arms or rods 25 and 26 are telescopically and removably received in the opposite open ends of the upper tubular side arms 23 and 24, and are secured in place by means of the headed fasteners or pins 25' and 26' which are disposable through aligned openings (not shown) in said tubular side arms 23 and 24 and through the horizontal portions of the L-shape arms or rods 25 and 26.

Transversely bored bearing members 27 and 28 are secured to the lower ends of the inverted L-shape arms or rods 25 and 26, and are adapted to receive the transversely extending removable axles 29 and 30 when extending transversely across the ends of the device. A plurality of spaced vertical passages 31 will be formed through the opposite ends of the axles 29 and 30 selectively receiving the headed fasteners or pins 32 for holding the rubber tire casing engaging and supporting wheels 33 in the desired transverse spaced position for supporting various sizes of tire casings and wheels.

Obviously, when a tire casing 13 and wheel 14 are to be mounted or demounted, it will be necessary only to remove the headed pins 26' and slide the inverted L-shape arm 26 from the upper tubular frame side arms 23 and 24, and to remove the wing nuts 12 from the bolts 10 and 11 and remove the end closure tube or pipe 9, thereby permitting the dolly frame to be rolled into position at the opposite sides of the tire casing 13 and wheel 14. The inverted L-shape arms 26 will then be replaced, as will the end closure tube or pipe 9, and the lift, now to be described may be operated.

Depending apertured lugs or ears 34 and 35 will be welded to and below the opposite ends of the upper tubular frame side arms 23 and 24, and similarly formed upwardly extending apertured lugs or ears 36 and 37 will be welded to the upper and opposite ends of the frame arms 1 and 2. Oppositely disposed pairs of tubular toggle tubes or links 38 and 39, and 40 and 41 will be pivotally connected respectively with the apertured lugs or ears 34 and 36, and 35 and 37, being secured by the pivot pins 42. The inner ends of the toggle tubes or links will be pivotally connected by means of the pins 44 with yokes 45 and 46 supported upon the outer ends of the opposed piston rods 47 and 48 which support the pistons 49 and 50 on their inner ends, the same being operable in the hydraulic cylinders 51 and 52 suitably mounted at the opposite sides of the device between the upper and lower longitudinal frame arms 1 and 23, and 2 and 24.

Connections 53 will be disposed approximately centrally of the hydraulic cylinders 51 and 52, and will be connected by means of the hose connections 54 with the fluid pipe lines 55 connected with a hand operated pump 56, which in turn, will be connected by the pipe 57 with a hydraulic fluid supply tank 58 suitably supported upon the device. A by-pass 59 is connected between the hydraulic fluid supply tank 58 and the pipe line 55 around the pump 56, and is provided with a control valve 60 for controlling the operation of the pump and lift.

In operation, the valve 60 will be closed and the hand pump 56 operated to pump the hydraulic fluid from the supply tank 58 into the cylinders 51 and 52 to force the pistons 49 and 50 therein apart, thus elevating the upper frame arms 23 and 24 through the connected toggle links, and the tire casing 13 and wheel 14 supported thereon. When it is desired to lower the lift, it is only necessary to open the valve 60 and permit the hydraulic fluid from the hydraulic cylinders 51 and 52 to flow back or bleed back into the storage tank 58.

From the foregoing description, it will be apparent that there has been devised and provided a highly efficient form of tire and wheel dolly and lift, which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. A tire and wheel dolly and lift including a U-shape lower supporting frame, a removable end closure therefor, casters disposed at the corners of said frame, an upper frame vertically slidably mounted on the lower frame, inverted L-shape arms detachably supported on the ends of the upper frame, transverse axles supported by said inverted L-shape arms, load engaging members on said axles and hydraulic means for raising and lowering said upper frame with respect to said U-shape lower supporting frame.

2. A tire and wheel dolly and lift including a U-shape lower supporting frame, a removable end closure therefor, casters disposed at the corners of said frame, an upper frame vertically slidably mounted on the lower frame, inverted L-shape arms detachably supported on the ends of the upper frame, transverse axles supported by said inverted L-shape arms, load engaging members on said axles, said members being adjustable longitudinally of the axles, and hydraulic means for raising and lowering said upper frame with respect to said U-shape lower supporting frame.

3. A tire and wheel dolly and lift including a U-shape lower supporting frame, a removable end closure therefor, casters disposed at the corners of said frame, an upper frame vertically slidably mounted on the lower frame, inverted L-shape arms detachably supported on the ends of the upper frame, transverse axles supported by said inverted L-shape arms, load engaging members on said axles, means for laterally adjusting said members, said members including wheels rotatably mounted on said axles, and hydraulic means for raising and lowering said upper frame and said wheels with respect to said U-shape lower supporting frame.

4. The subject matter as claimed in claim 3, wherein said hydraulic means includes hydraulic cylinders, opposed pistons and piston rods disposed in said cylinders, and toggle connections between said piston rods and said upper and lower frames.

5. The subject matter as claimed in claim 3, wherein said hydraulic means includes hydraulic cylinders, opposed pistons and piston rods disposed therein, toggle connections between said piston rods and said upper and lower frames, a hydraulic fluid supply tank connected with said hydraulic cylinders, and a fluid pump interposed between said tank and cylinders.

6. The subject matter as claimed in claim 3, wherein said hydraulic means includes hydraulic cylinders, opposed pistons and piston rods disposed therein, toggle connections between said piston rods and said upper and lower frames, a hydraulic fluid supply tank connected with said hydraulic cylinders, a fluid pump interposed between said tank and cylinders, and a valve by-pass connected from said tank around said fluid pump.

WILLIAM G. MEREDITH.

REFERENCES CITED

The following references are of record in the file of this patent:

UNITED STATES PATENTS

| Number | Name | Date |
| --- | --- | --- |
| 1,261,428 | Norman | Apr. 2, 1918 |
| 1,555,152 | Passow | Sept. 29, 1925 |
| 2,357,633 | Cowgill | Sept. 5, 1944 |
| 2,429,723 | Kelley | Oct. 28, 1947 |